W. W. Eastman,
Sheave Bearing.
No. 103,587. Patented May 31, 1870.
Fig. 1.  Fig. 2.
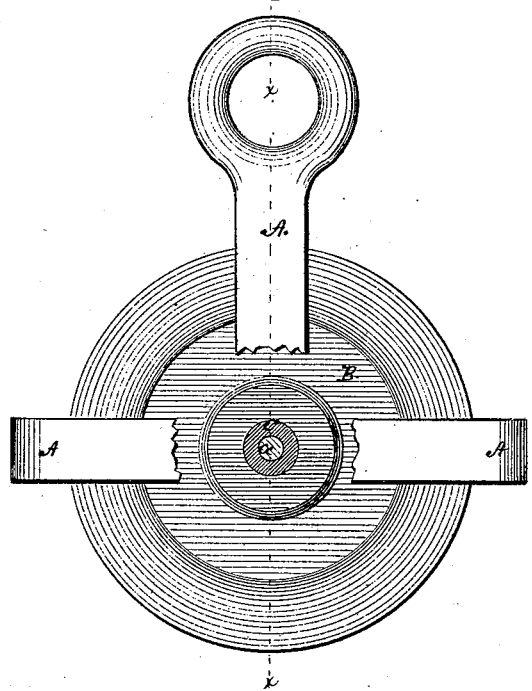 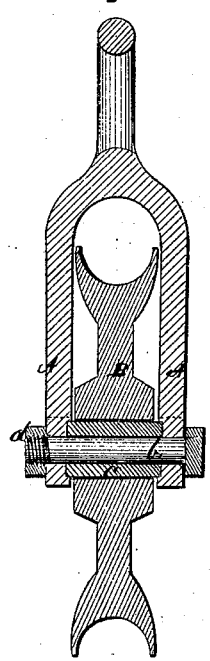
Fig. 3.  Fig. 4.
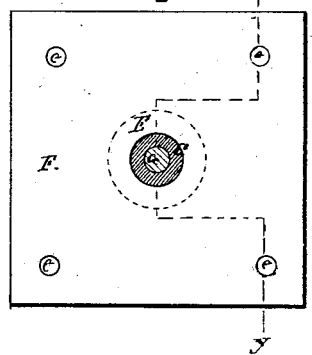 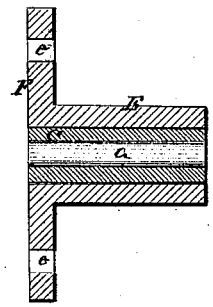
Witnesses.
Chas. H. Poole
Auren Knapp
Inventor.
Wm. W. Eastman
By J. B. Woodruff & Son
Attorneys of Record

United States Patent Office.

WILLIAM W. EASTMAN, OF MEADVILLE, PENNSYLVANIA.

Letters Patent No. 103,587, dated May 31, 1870.

IMPROVED BEARING FOR SHEAVES.

The Schedule referred to in these Letters Patent and making part of the same.

*To all whom it may concern:*

Be it known that I, WILLIAM W. EASTMAN, of Meadville, in the county of Crawford and State of Pennsylvania, have invented certain new and useful Improvements in the Center Bearings of Sheaves for Pulley Blocks; and the following is a full, clear, and exact description of the same, reference being had to the accompanying drawing making a part of this specification, in which—

Figure 1 represents a side view of the pulley, with a portion of the block-frame or hanger broken out, showing the chilled center, the sleeve or thimble on which the sheave has its bearing.

Figure 2 shows an edge view section through the center of the pulley and wrought-iron frame, or block equivalent.

Figure 3 is a face view of the plate and chilled bush for the center hole for wooden sheaves for pulley-blocks.

Figure 4 is a section through the same, showing the chilled sleeve on which the sheave turns and has its bearing.

The object of my invention is to remedy an evil, and prevent the center hole in sheaves or pulleys, and the bolt or pin, on which the great strain comes in raising weights, from wearing out, and also greatly lessening the friction on the pulley-blocks or tackle.

My invention consists in chilling the center hole through cast-iron sheaves, and making it smooth and large enough to receive a chilled cast-iron thimble to fit nicely for the sheave to run on, the bolt going through and fitting the thimble or screw, holding it firmly clamped in between the sides of the frame or block, so that the sleeve will not turn on the bolt, the bearing-surfaces of both sheave and thimble being as hard as metal can be made, and when lubricated, run with the least friction and wear possible.

A chilled iron-plate bushing, and a sleeve or thimble, may also be used for wood sheaves, in the same manner, for ordinary ship-blocks and tackle, which work easier, and will be much more durable.

To enable others to make and use my invention, I will describe it more fully, referring to the drawing and the letters marked thereon.

My invention, as shown in this application, represents the frame or hanger A, made of wrought iron, with a single sheave or pulley, B, such as are mostly used in boring artesian or oil wells, where there is a constant action on the pulley B, so that the sheave and pin, when constructed in the ordinary manner, will wear out, so as to be useless, in from one to three weeks, and have to be replaced by new ones.

I make my improved tackle-block by casting the sheaves on a smooth iron core, sufficiently large to fit a sleeve or thimble, c, cast in a mold, so that the outer surface will be as hard as metal can be made, with a hole, a, through, of sufficient size for a bolt, b, of suitable strength, the bolt being provided with a nut, d, so that the ends of the sleeve c can be brought to bear hard against the frame or hanger A A, and, if desired, they can be slightly recessed when being forged, by placing a thimble in the proper position and setting the sides onto it, as shown in the sectional view, fig. 2, so that the bolt b will be mostly relieved of the pulling strain. The hard thimble being held so firmly forms the pin for the chilled hard surface of the hole cast in the sheave B to work on.

The same improvement may be used with equal success for bushing wood sheaves, by making a chilled bush, E, having a flange plate, F, on one end, to let into one side of the hard-wood sheave, to be secured by screws or rivets, through the holes e e in, the flange F, the sleeve or thimble c and bolt used being the same as above described.

It has been practically demonstrated that a block and tackle, constructed as above described, will run and operate more than twice as easy, and last ten times longer than any of those heretofore in use, and the cost of making is no more than those made in the ordinary manner.

What I claim as my invention, and desire to secure by Letters Patent, is—

Casting the center hole in sheaves for pulley-blocks or tackle on a chill, made to fit and run on a hard chilled cast-iron sleeve or thimble, when the said thimble is clamped firmly in a frame, hanger, or block, and secured by a bolt, or its equivalent, substantially in the manner as and for the purposes set forth.

In testimony whereof I hereunto subscribe my name in the presence of—

WILLIAM W. EASTMAN.

Witnesses:
   J. B. WOODRUFF,
   J. B. LYONS.